Jan. 2, 1968 W. B. HOLDRIDGE 3,361,433
COLLET CLOSER
Filed March 22, 1965 2 Sheets-Sheet 1
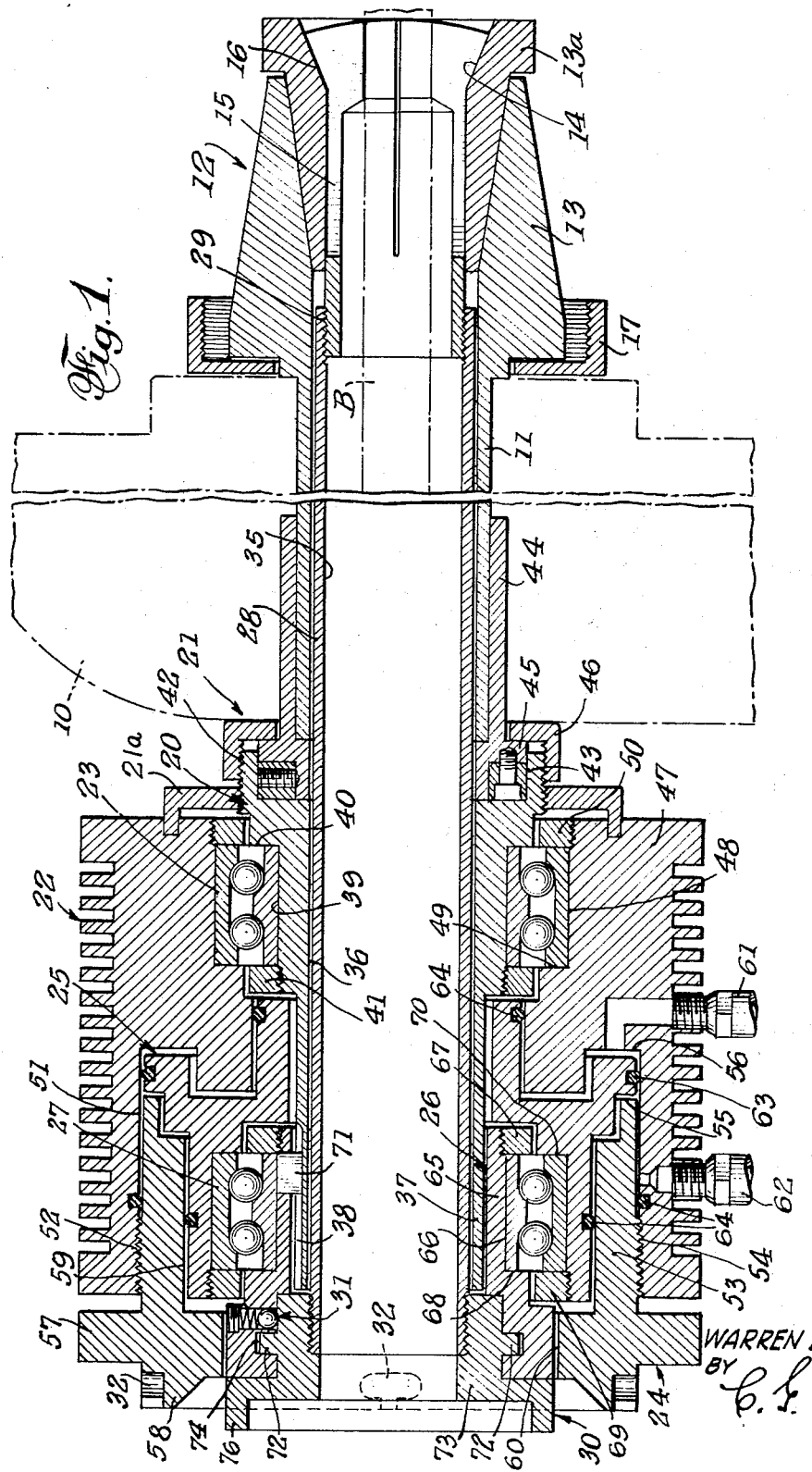
INVENTOR
WARREN B. HOLDRIDGE
BY
C. L. Stratton
ATTORNEY

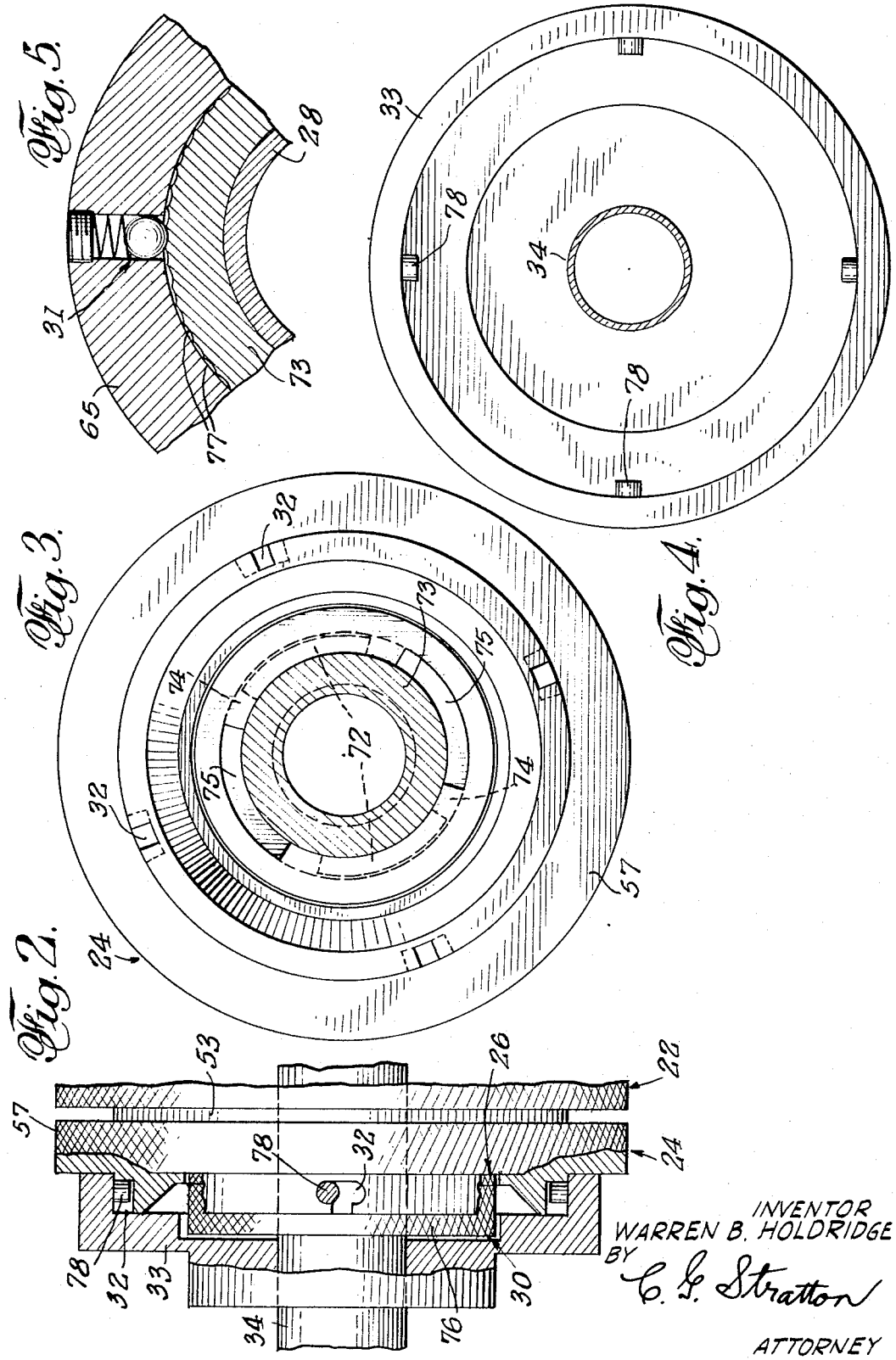

United States Patent Office 3,361,433
Patented Jan. 2, 1968

3,361,433
COLLET CLOSER
Warren B. Holdridge, Los Angeles, Calif.
(116 W. 154th St., Gardena, Calif. 90247)
Filed Mar. 22, 1965, Ser. No. 441,664
6 Claims. (Cl. 279—4)

ABSTRACT OF THE DISCLOSURE

A collet closer that comprises an air cylinder permanently mounted on the headstock of a lathe or comparable machine, the same having a through passage and provided with an adjusting nut for regulating the stroke of a piston operative in said cylinder. A bearing and mounting sleeve is held coaxially with the cylinder and piston by a radial bearing that provides for rotation of said sleeve relative to the air cylinder. A second radial bearing is provided between the piston and a retainer ring which has a sliding keyed connection with the mentioned bearing and mounting sleeve. A draw tube, commonly referred to as a drawbar, extends through the bearing and mounting sleeve and through the headstock of the lathe, the end thereof having a threaded connection with the spring collet of a chuck or other work-holding device extending from said headstock on the side thereof toward a tool or tools to operate on a work-piece held by the chuck. Said chuck, in any of the usual ways, is mounted on a rotationally driven lathe spindle housed in the headstock and through which the drawbar extends. The outer end of the drawbar is provided with a lock nut that has quick-release connection with the retainer ring and also a spring detent inter-engagement that affords rotational adjustment of said lock nut and of said drawbar so that by the threaded connection between the end of the latter and the collet a variable adjustment is effected in the opening of the collet, the adjustment making it possible to open or close clearance mounting on bar being worked. Said lock nut controls the travel of the piston to control and stop the travel of the collet in any specific required position.

This invention relates to means for controlling the opening and closing movements of the collet of a chuck or other work-holding device in lathes or comparable machine tools.

An object of the present invention is to provide a collet-controlling device that is pneumatically operated.

Another object of the invention is to provide a pneumatically operated collet closer in which the collet draw-in or closing movement and the pressure thereof on a piece of work is adjustably controlled, as desired.

A further object of the invention is to provide a device, as above characterized, that embodies a simplified construction enabling rapid draw tube removal from a firmly locked position that does not use the usual cumbersome snap-ring or mounting bolts, thereby enabling quick change of collet or air chuck to manually-operated chucks.

A still further object of the invention is to provide a collet closer, as characterized, that includes a permanently fixed air cylinder that is so designed as to enable feeding parts to be worked on by the machine without turning the same on and off.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes one embodiment of the present invention, which is given by way of illustration or example only.

In the drawings, like reference characters designate similar parts in the several views.

FIG. 1 is a broken longitudinal sectional view of a collet closer according to the present invention.

FIG. 2 is a broken partly elevational and partly sectional view of the portion of the present device at the outer end of air cylinder and the air cylinder adjusting nut, the view showing a bar feed mounted in operative position on said lock nut.

FIG. 3 is an end elevational view of said adjusting nut, the piston-bearing retainer nut in the center thereof, with the drawbar lock nut in cross-section and connected to the latter nut.

FIG. 4 is a face view of the mounting disc of the feed bar fitted to the device, as in FIG. 2.

FIG. 5 is a fragmentary and enlarged cross-sectional view showing details of spring detent means for adjusting collet clearance in respect to a work-piece.

The present collet closer is mounted on the housing of a headstock 10 of a machine lathe or other machine that has a driven hollow spindle 11 and has a chuck or other work-piece gripping device 12 extending from said spindle. Such a device may have a body 13 provided as an integral extension of the spindle 11, a hollow nose piece 13a fitted into the end of said body and having a conically flared opening 14, and a spring collet 15 extending through the hollow of the nose piece and having a conical end 16 that has a slope that fits the flared opening and causes contraction of the collet around a bar B to grip the same. Thus, rotation of the spindle 11 causes the bar B to rotate so that a tool or tools may cut into the portion of said bar that extends from the collet. The chuck 12 is shown with a chuck lock ring nut 17 of conventional design to enable mounting various chucks on the chuck body 13.

The collet closer that is illustrated comprises, generally, a bearing and mounting sleeve 20, means 21 for connecting said sleeve 20 to the lathe spindle 11 and having bearing in the headstock 10, a cylinder 22 mounted, by an anti-friction bearing 23, on the sleeve 20, a nut 24 adjustably carried by the cylinder and forming an end closure for said cylinder, a piston 25 operable in the cylinder 22, a piston bearing retainer 26, an anti-friction bearing 27 between said piston 25 and retainer 26, a drawbar 28 having a threaded connection 29 with the collet 15 and extending through the spindle 11 and the bore of the bearing and mounting sleeve 20, a lock nut 30 connected to the outer end of said drawbar for quick-release engagement with the piston bearing retainer 26, and means 31 comprising a spring detent for setting and maintaining longitudinal adjustment of the drawbar relative to the chuck 15 to vary and, thereby control, collet draw-in and collet pressure on a work-piece B.

The adjusting nut 24 is formed to have bayonet slots 32 for quick-release engagement by a flange 33 intermediate the ends of a feed tube 34 that extends into the drawbar bore 35. Said feed tube 34 forms no part of the present invention, but is here shown to disclose the manner of the facile application and withdrawal of said tube for feeding lengths of stock B to the spindle 11. Patent No. 3,070,238 shows one form of automatic bar feed which may be used with the present collet closer.

The bearing and mounting sleeve 20 has a bore 36 into which the drawbar loosely extends. At its outer end, said sleeve has a reduced tubular portion 37 that is provided with a longitudinal keyway 38. At its opposite end, said sleeve is provided with a cylindrical seat 39 for the bearing 23, the inner race of which is confined between an annular shoulder 40 of said sleeve and a bearing locking nut 41. At its inner end, said sleeve 20 is enlarged with an outer thread 42 on the enlarged portion and an annular seat 43 within said threaded portion. A bearing member 21a engages the threads 42 on the enlarged portion of sleeve 20 and includes an outwardly projecting flange which engages the inner front wall of the cylinder 22.

The connecting means 21 has a sleeve portion 44 that is affixed to the outer end of the spindle 11, and an enlarged outer annular portion 45 that fits into the annular seat 43 of the sleeve 20. A ring nut 46 engages said sleeve portion 45 and has connection with the thread 42, thereby locking said sleeve 20 and rotating with the spindle 11. It will be clear that the headstock 10 houses gearing that is connected to the spindle 11 to rotate the latter, as desired.

The cylinder 22 comprises a body 47 that is mounted on the outer race of the bearing 23 which fits into a cylindrical bore 48 of said body between an annular shoulder 49 of the body and a nut 50. Thus, the cylinder body 47 is mounted on the sleeve 20 so the latter may rotate at spindle speed with but minimal torque on the cylinder body.

The outer end of said body 47 has a cylinder bore 51 which is defined radially between the portion 37 of the sleeve 20 and an annular wall 52 which is an outer longitudinal extension of the cylinder body 47.

The nut 24 has an annular wall 53 that extends into the cylinder bore 51. A threaded connection 54 between the cylinder wall 52 and said nut wall 53 provides a means by which the nut may be adjusted to set the piston-travel limiting wall 55 of the nut with relation to the end wall 56 at the bottom of the cylinder bore 51. Said nut 24 has an outer flange 57 with an extending boss 58. The cylindrical face of the nut is provided with a set of bayonet slots 32, as before described, to releasably mount the feed tube 34. Said annular wall 53 of the nut 24 has a bore 59. The flange 57 and its extending boss 58 has a bore 60 that is smaller than the bore 59.

The piston 25 is reciprocatively disposed in the cylinder bore 51, part of which is formed by the bore 59 in the nut 24 to be movable between the walls 55 and 56. An air line connection 61 provides a jet of air to propel the piston in one direction and a similar and longitudinally spaced air line 62 provides a jet of air to propel the piston in the opposite direction. An ordinary two-way valve may control the air flow from a source of compressed air to said lines 61 and 62, the same being controlled normally or by pedal operation, as desired. An O-ring 63, carried by the piston, seals between the opposite sides of the piston-moving air jets. Additional O-rings 64 may be provided, where needed, to seal against air leakage from the cylinder bore.

It will be realized that the lines 61 and 62, being connected to a flow-controlling valve, whether the same are flexible or rigid, retain the cylinder body 47 against rotative movement.

The retainer 26 comprises a ring 65 into the bore 66 of which the tubular portion 37 of the bearing and mounting sleeve 20 extends. Said ring 65 is provided with a nut 67 that secures the inner race of the anti-friction bearing 27 against an annular shoulder 68 of said ring 65. Similarly, but oppositely, a nut 69 on the piston secures the outer race of said bearing 27 against an annular shoulder 70 of the piston. In this manner the piston 25 is mounted on the retainer 26, the latter moving reciprocatively with the piston as propelled by the air jets from lines 61 and 62.

A key 71 extends from the ring 65 into the keyway 38 in said tubular portion 37 of the sleeve 20. Said key imparts the rotation of sleeve 20 to the retainer 26.

The drawbar 28 freely extends through the spindle 11 and the sleeve 20 which comprises an outer extension of said spindle. The lock nut 30 is fixedly connected to the outer end of the drawbar so that the bar and the nut may rotate together.

Said nut 30 is provided with segmental keys 72 that are diametrally provided on the nut body 73, said keys having connection engagement in grooves 74 formed in the retainer 26. Said keys 72 are first entered in spaces 75 which alternate circumferentially with the grooves 72. Then, a part turn of the nut effects a locked engagement of said nut and retainer. A flange 76 on the outer end of said nut 30 provides a manually engageable part that enables ready insertion and removal of drawbar 28 and the nut 30. The threaded connection 29 is made from the chuck end by entering the collet 15 into the nose piece 13a.

In order to make a fine adjustment of the collet travel for desired open or close clearance mountings on a workpiece B, the flange 76 is rotated so as to turn the drawbar 28 in one direction or the other to take up or slack off on the threaded connection 29. The detent 31, carried by the piston and bearing retainer 26 has ratcheting engagement with dimples 77 in the cylindrical face of the nut body 73, as shown best in FIGS. 1 and 5. These dimples retain the adjustment of the drawbar.

As seen in FIGS. 2 and 4, the bayonet notches 32 are engaged by pins 78 provided on the flange 33 of the feed tube 34.

While the foregoing has illustrated and described what is now contemplated to be the best mode of carrying out the invention, the construction is, of course, subject to modification without departing from the spirit and scope of the invention. Therefore, it is not desired to restrict the invention to the partciular form of construction illustrated and described, but to cover all modifications that may fall within the scope of the appended claims.

Having thus described this invention, what is claimed and desired to be secured by Letters Patent is:

1. In a closer for the collet of a chuck on the end of a driven hollow spindle:
   (a) a mounting sleeve connected to and forming a rotatable extension of the spindle,
   (b) a cylinder having a cylinder bore and provided with longitudinally spaced air-supplying lines entering spaced portions of said bore,
   (c) a piston in said cylinder bore having a portion disposed in sealing engagement with said bore between the air lines,
   (d) a drawbar extending longitudinally through said spindle and mounting sleeve,
   (e) a nut on the outer end of the drawbar,
   (f) a retainer ring rotational within the piston, and
   (g) separable connection means between the nut and the retainer ring.

2. In a closer according to claim 1:
   (a) an anti-friction bearing between said mounting sleeve and the cylinder, the latter being held against rotation by the air-supplying lines during rotation in said bearing of the former, and
   (b) a second anti-friction bearing between the piston and the retainer ring, the former being retained non-rotational by the sealing engagement thereof with the cylinder bore while the latter is rotationally driven.

3. In a collet closer according to claim 2:
   (a) said retainer ring is provided with an inwardly projecting spring-urged detent which engages with dimples in the outer face of the nut on the drawbar to retain the parts in adjusted position.

4. In a collet closer according to claim 1:
   (a) a nut is adjustably carried by said cylinder and form an end closure for said cylinder,
   (b) said nut extending into the cylinder and being formed with a bore defining a part of the cylinder bore.

5. In a collet closer according to claim 6:
   (a) said mounting means for the cylinder on the headstock of a lathe includes a mounting sleeve connected to said spindle provided with a longitudinal keyway at its inner end, and (b) a key extends from said keyway and is connected to said retainer ring to provide rotation of the mounting sleeve and retainer ring.

6. In a collet closer having a hollow rotational spindle and a drawbar extending through said spindle and rotational therewith:

(a) a cylinder having an axial cylinder bore for receiving said spindle and drawbar, mounting means for said cylinder on the headstock of a lathe, (b) means to conduct air pressure to said cylinder bore (c) a piston movable in said bore and connected to the drawbar to move the latter longitudinally under pressure of said air, (d) a rotational bearing in the connection between the piston and drawbar, (e) an extension on said spindle, (f) a bearing between the cylinder and said extension, (g) a nut on the outer end of the drawbar, (h) a retainer ring rotational within the piston, and (i) separable connecting means between said nut and said retainer ring.

References Cited
UNITED STATES PATENTS

| | | |
|---|---|---|
| 2,375,115 | 5/1945 | Kylin. |
| 2,455,586 | 12/1948 | Kooima _____ 279—4 |
| 2,782,044 | 2/1957 | Gabriel _____ 279—4 |
| 3,143,356 | 8/1964 | Pray _____ 279—4 |

ROBERT C. RIODON, *Primary Examiner.*

E. A. CARPENTER, *Assistant Examiner.*